United States Patent
Bian et al.

(10) Patent No.: US 10,185,092 B1
(45) Date of Patent: Jan. 22, 2019

(54) HYBRID GRATING COUPLERS THAT OVERLAP VIA AN INTERCONNECT STRUCTURE HAVING A METALLIZATION LAYER

(71) Applicant: GLOBALFOUNDRIES Inc., Grand Cayman (KY)

(72) Inventors: Yusheng Bian, Ballston Lake, NY (US); Ajey Poovannummoottil Jacob, Watervliet, NY (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 0 days.

(21) Appl. No.: 16/032,705

(22) Filed: Jul. 11, 2018

(51) Int. Cl.
*G02B 6/34* (2006.01)
*G02B 6/42* (2006.01)
*G02B 6/124* (2006.01)

(52) U.S. Cl.
CPC .............. *G02B 6/34* (2013.01); *G02B 6/124* (2013.01); *G02B 6/4214* (2013.01)

(58) Field of Classification Search
CPC ......... G02B 6/34; G02B 6/124; G02B 6/4214
See application file for complete search history.

(56) References Cited

U.S. PATENT DOCUMENTS

| 5,033,812 | A | 7/1991 | Yoshida et al. | |
|---|---|---|---|---|
| 6,169,637 | B1* | 1/2001 | Tsunashima | G02B 17/0808 359/726 |
| 6,212,153 | B1* | 4/2001 | Chen | B82Y 10/00 369/112.12 |
| 7,283,695 | B2* | 10/2007 | Gaylord | G02B 6/02085 385/14 |
| 8,515,223 | B2* | 8/2013 | Fiorentino | B29D 11/00298 385/33 |
| 8,625,941 | B1 | 1/2014 | Shi et al. | |
| 9,632,248 | B2* | 4/2017 | Selvaraja | G02B 6/30 |
| 2002/0191916 | A1 | 12/2002 | Frish et al. | |
| 2004/0156589 | A1 | 8/2004 | Gunn, III et al. | |
| 2006/0067617 | A1* | 3/2006 | Gaylord | G02B 6/02085 385/37 |
| 2011/0133063 | A1 | 6/2011 | Ji et al. | |
| 2012/0027349 | A1* | 2/2012 | Fiorentino | B29D 11/00298 385/37 |
| 2014/0321493 | A1* | 10/2014 | Matsumoto | B82Y 20/00 372/50.11 |
| 2014/0323323 | A1* | 10/2014 | Cunningham | G01N 21/648 506/9 |

(Continued)

OTHER PUBLICATIONS

Breck Hitz, "Gratings Couple Optical Fibers to Silicon Photonic Devices", Photonics Spectra, Nov. 2005.

(Continued)

*Primary Examiner* — Andrew Jordan
(74) *Attorney, Agent, or Firm* — Thompson Hine LLP

(57) ABSTRACT

Structures for grating couplers and methods of fabricating a structure including grating couplers. A first grating coupler includes a first plurality of grating structures. An interconnect structure includes a first metallization level that is positioned over the first grating coupler. A second grating coupler includes a second plurality of grating structures that are arranged in the first metallization level to overlap with the first grating coupler. The second plurality of grating structures are composed of a metal.

20 Claims, 7 Drawing Sheets

(56) References Cited

U.S. PATENT DOCUMENTS

| | | | |
|---|---|---|---|
| 2015/0285996 A1* | 10/2015 | Selvaraja | G02B 6/30 |
| | | | 385/14 |
| 2016/0204002 A1* | 7/2016 | Wallace | H01L 21/76897 |
| | | | 257/773 |
| 2016/0238447 A1* | 8/2016 | Cho | G01J 3/0224 |
| 2017/0047312 A1 | 2/2017 | Budd et al. | |
| 2018/0204763 A1* | 7/2018 | Wallace | H01L 21/0337 |

OTHER PUBLICATIONS

Sacher et al., "Wide bandwidth and high coupling efficiency Si3N4-on-SOI dual-level grating coupler", Optics Express vol. 22, Issue 9, pp. 10938-10947 (2014).

Scheerlinck et al., "Efficient, broadband and compact metal grating couplers for silicon-on-insulator waveguides", Optics Express vol. 15, Issue 15, pp. 9625-9630 (2007).

Dabos et al., "TM grating coupler on low-loss LPCVD based SiN waveguide platform", vol. 405, Dec. 15, 2017, pp. 35-38, abstract only.

* cited by examiner

US 10,185,092 B1

HYBRID GRATING COUPLERS THAT OVERLAP VIA AN INTERCONNECT STRUCTURE HAVING A METALLIZATION LAYER

BACKGROUND

The present invention relates to photonics chips and, more specifically, to structures for grating couplers and methods of fabricating a structure including grating couplers.

Photonic chips are used in many applications and systems including, but not limited to, data communication systems and data computation systems. A photonic chip integrates optical components, such as waveguides, and electronic components, such as field-effect transistors, into a unified platform. Layout area, cost, and operational overhead, among other factors, may be reduced by integrating both types of components on a single photonics chip.

Grating couplers are commonly used to couple light from an optical fiber into an on-chip waveguide, which is considerably smaller than the optical fiber. Light that diffracts from the grating coupler will constructively interfere at a given scattering angle that is directed toward the optical fiber and into a waveguide on the photonics chip. The scattering angle of the grating coupler may be determined by the period of its constituent grooves. Grating couplers composed of silicon nitride or polycrystalline silicon may have a low coupling efficiency that limit their effectiveness for use in coupling optical signals into and out of waveguides composed of silicon nitride or polycrystalline silicon.

Improved structures for grating couplers and methods of fabricating a structure including grating couplers are needed.

SUMMARY

In an embodiment of the invention, a structure includes a first grating coupler with a first plurality of grating structures, an interconnect structure having a first metallization level that is positioned over the first grating coupler, and a second grating coupler having a second plurality of grating structures that are arranged in the first metallization level to overlap with the first grating coupler. The second plurality of grating structures are composed of a metal.

In an embodiment of the invention, a method includes patterning a first layer to form a first grating coupler having a first plurality of grating structures, and forming a second plurality of grating structures of a second grating coupler in a first metallization level of an interconnect structure. The second plurality of grating structures of the second grating coupler are arranged in the first metallization level over the first plurality of grating structures of the first grating coupler, and the second plurality of grating structures are composed of a metal.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Figure 1:
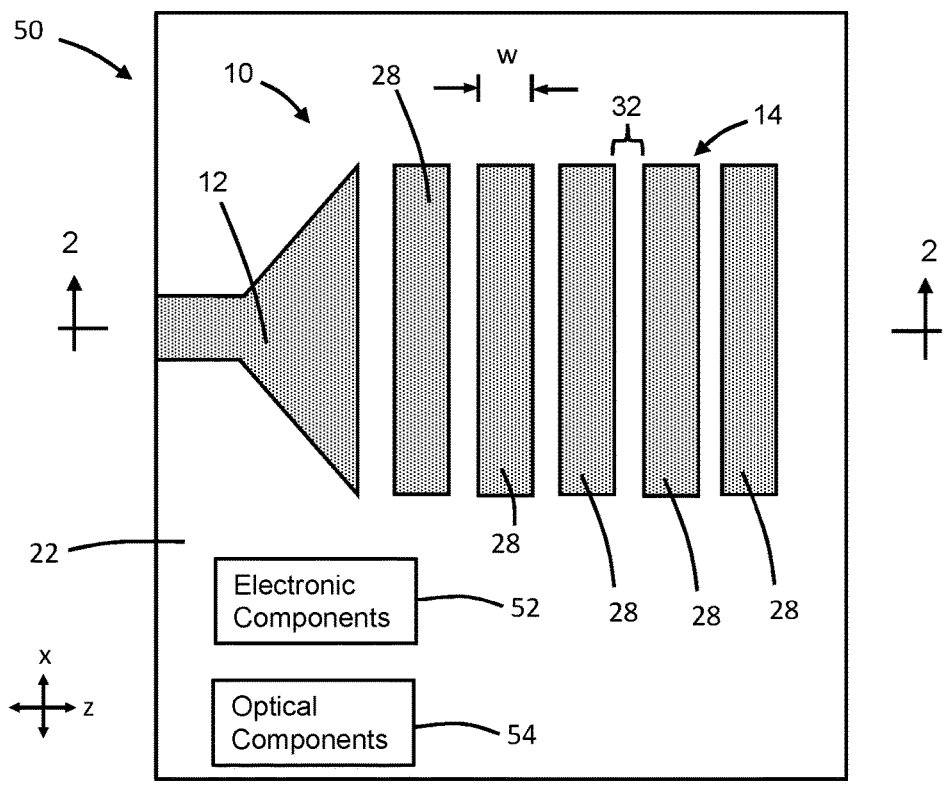
FIG. 1 is a top view of a photonics chip including a waveguide arrangement at an initial fabrication stage of a processing method in accordance with embodiments of the invention.
Figure 2:
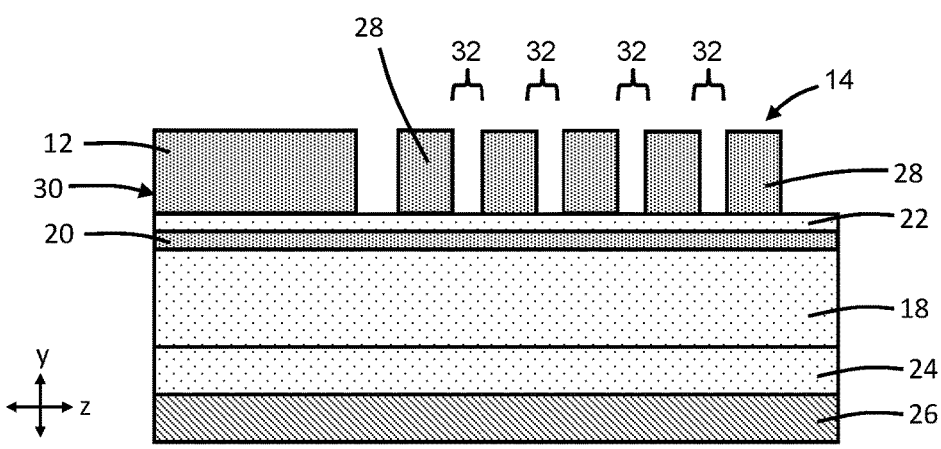
FIG. 2 is a cross-sectional view of the waveguide arrangement taken generally along line 2-2 in FIG. 1.

With reference to FIGS. 1, 2 and in accordance with embodiments of the invention, a structure 10 includes a waveguide 12 and a grating coupler 14 coupled with the waveguide 12. The structure 10 may be arranged on a layer stack including dielectric layers 18, 20, 22 in which the dielectric layer 18 replaces a section of a device layer (not shown) of a silicon-on-insulator (SOI) substrate. The structure 10 and dielectric layers 18, 20, 22 may be arranged over a buried oxide (BOX) layer 24 of the SOI substrate. The dielectric layer 18 and the dielectric layer 22 may be composed of a dielectric material, such as silicon dioxide ($SiO_2$), deposited by atomic layer deposition (ALD) or chemical vapor deposition (CVD). The dielectric layer 20 may be composed of a dielectric material, such as silicon nitride ($Si_3N_4$), deposited by atomic layer deposition or chemical vapor deposition. The BOX layer 24 may be composed of a dielectric material, such as silicon dioxide (e.g., $SiO_2$), and is located over a handle wafer 26 of the SOI substrate. The dielectric layers 18, 20, 22 and BOX layer 24 may operate as a lower cladding providing confinement for the waveguide 12 and grating coupler 14.

The grating coupler 14 includes an arrangement of grating structures 28 defined in a layer 30 by trenches or grooves 32. In the representative embodiment, the grooves 32 extend fully through the layer 30 such that the grating structures 28 are disconnected from each other. The grooves 32 define respective spaces or gaps arranged between adjacent pairs of the grating structures 28. In the representative embodiment, the grating structures 28 and grooves 32 may be arranged as a group of spaced-apart parallel lines having given dimensions (e.g., width, w, and length). In an alternative embodiment, the grating structures 28 and grooves 32 may be arranged as a group of concentric arcs that are nested together and that have given dimensions (e.g., width and arc length). The grating structures 28 and grooves 32 may have a given periodicity defined by a pitch and a filling factor or duty cycle relating to their dimensions. The pitch represents a distance between adjacent grating structures 28, and the duty cycle represents a fraction of the area of the grating coupler 14 that is occupied by the grating structures 28.

The grooves 32 may be formed by a lithography and etching process that applies an etch mask over the layer 30 and that etches the masked layer 30 with an etching process, such as reactive ion etching (RIE). The etching process may be selected to stop on the material of the dielectric layer 22 after penetrating fully through the layer 30. In an embodiment, the grating structures 28 and the layer 30 may be composed of a non-metal, such as a dielectric material or a polycrystalline semiconductor material. In an embodiment, the grating structures 28 and the layer 30 may be composed of a dielectric material, such as a nitride of silicon (e.g., silicon nitride ($Si_3N_4$)), that is deposited by chemical vapor deposition. The waveguide 12 may be concurrently formed from the material of the layer 30 by the same lithography and etching process forming the grating coupler 14. In the representative embodiment, the grating structures 28 are depicted as rectangular shapes having vertical sidewalls. However, in alternative embodiments, the grating structures 28 may be trapezoidal with sidewalls tapering from top to bottom, trapezoidal with sidewalls having inverse tapering (i.e., flaring) from top to bottom, or non-rectangular (e.g., rounded sidewalls).

Figure 3:
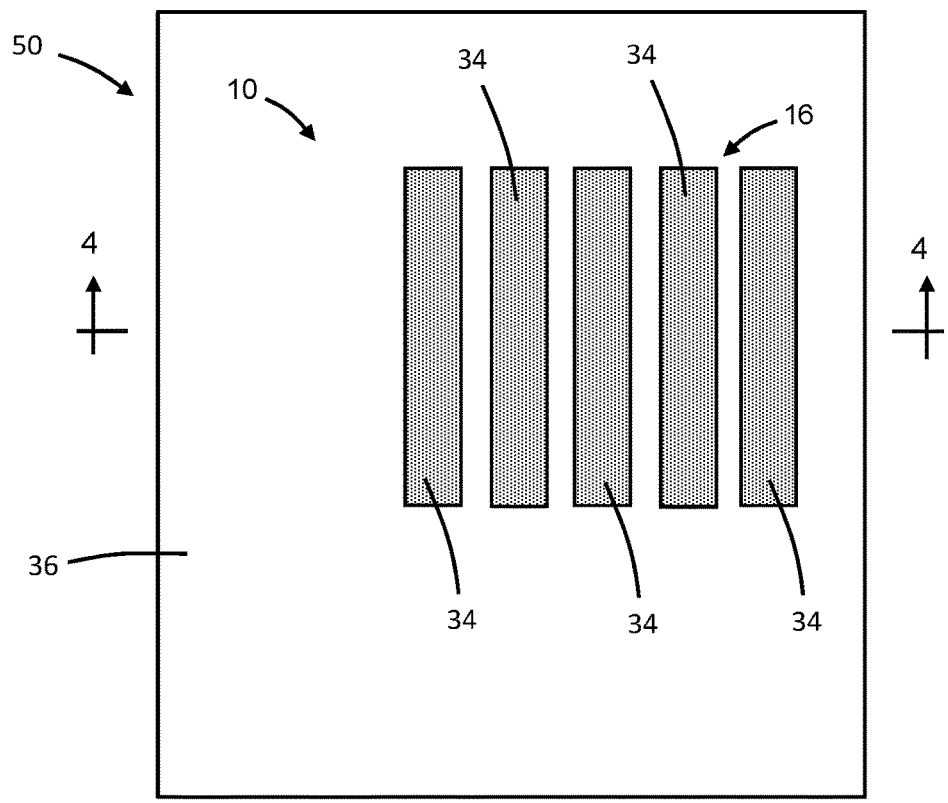
FIG. 3 is a top view of the photonics chip at a fabrication stage of the processing method subsequent to FIGS. 1 and 2.
Figure 4:
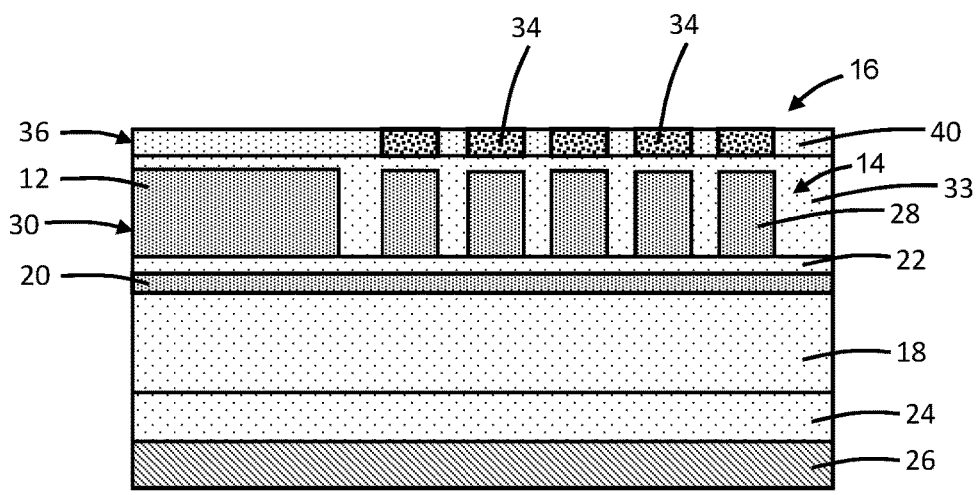
FIG. 4 is a cross-sectional view of the waveguide arrangement taken generally along line 4-4 in FIG. 3.

With reference to FIGS. 3, 4 in which like reference numerals refer to like features in FIGS. 1, 2 and at a subsequent fabrication stage of the processing method, a gap-fill layer 33 is formed that fills the grooves 32 and the space around the waveguide 12, and that also covers the layer 30 and grating structures 28. The gap-fill layer 33 may be composed of a dielectric material, such as silicon dioxide ($SiO_2$), deposited by chemical vapor deposition. The dielectric material of the gap-fill layer 33 is different from the material constituting the grating structures 28. The gap-fill layer 33 may be formed by depositing a layer of its constituent dielectric material, planarizing the deposited layer with, for example, chemical mechanical polishing (CMP), and recessing the planarized layer with an etch-back process to provide a desired thickness of dielectric material over the layer 30.

The structure 10 further includes a grating coupler 16 that is coupled with the grating coupler 14 to form, in conjunction with the grating coupler 14, a hybrid grating coupler. The grating coupler 16 includes multiple grating structures 34 that are arranged over the grating coupler 14 and in a metallization level 36 of an interconnect structure that may be formed by back-end-of-line (BEOL) processing. The metallization level 36 includes an interlayer dielectric layer 40 of that is formed over the gap-fill layer 33 and the grating structures 34 are embedded as features in the interlayer dielectric layer 40. In an embodiment, the metallization level 36 may be a lower metallization level in the interconnect structure, such as the lowest metallization level (M1) that is directly above the electronic components of the photonics chip, and the grating structures 34 are all arranged in the same metallization level 36 of the interconnect structure 38.

The interlayer dielectric layer 40 may be composed of an electrical insulator, such as silicon dioxide ($SiO_2$), a low-k dielectric material, or an ultra-low-k (ULK) dielectric material, deposited by chemical vapor deposition. The grating structures 34 may be composed of a metal, such as copper (Cu), cobalt (Co), aluminum (Al), or titanium nitride (TiN), that is found in BEOL processing. The grating structures 34 may be formed in the interlayer dielectric layer 40 by a damascene process in which openings are formed by photolithography and etching in the interlayer dielectric layer 40, the openings are filled by depositing a metal layer by, for example, chemical vapor deposition, and the metal layer filling the openings is planarized by chemical mechanical polishing. In the representative embodiment, the grating structures 34 are depicted as rectangular shapes having vertical sidewalls. However, in alternative embodiments, the grating structures 34 may be trapezoidal with sidewalls tapering from top to bottom, trapezoidal with sidewalls having inverse tapering (i.e., flaring) from top to bottom, or non-rectangular (e.g., rounded sidewalls).

Adjacent grating structures 34 are separated by gaps that are occupied by the dielectric material of the interlayer dielectric layer 40. The grating structures 34 in the arrangement forming the grating coupler 16 may have a periodicity with a given period or pitch and a given filling factor or duty cycle. In the representative embodiment, the pitch of the grating structures 34 is equal to, or substantially equal to, the pitch of the grating structures 28, and the duty cycle of the grating structures 34 is equal to, or substantially equal to, the duty cycle of the grating structures 28. As a result, the gaps between adjacent grating structures 34 of the grating coupler 16 are equal in width to the width of the grooves 32 between the grating structures 28 of the grating coupler 14, the grating structures 34 have the same width as the grating structures 28, and each of the grating structures 34 is arranged directly over one of the grating structures 28 with aligned side edges.

The structure 10, in any of its embodiments described herein, may be integrated into a photonics chip 50 (FIG. 1) that includes electronic components 52 and other types of optical components 54. For example, the photonics chip 50 may integrate one or more photodetectors representing optical components 54 that receive optical signals carried by the structure 10 and convert those optical signals into electrical signals that may be processed by the electronic components. The electronic components 52 may include field-effect transistors that are fabricated by CMOS front-end-of-line processings using the device layer of the SOI substrate. The hybrid grating coupler may couple optical signals from the optical components 54 on the photonics chip 50 to an external optical fiber or, alternatively, may couple optical signals arriving from an external optical fiber to the optical components 54 on the photonics chip 50. In an embodiment, the metallization level 36 is the lowest metallization level (M1) that is directly positioned over the electronic components 52 of the photonics chip 50 and the grating coupler 14 and other optical components 54. The metallization level 36 may include additional features (not shown) that are connected with the electronic components 52.

Figure 5:
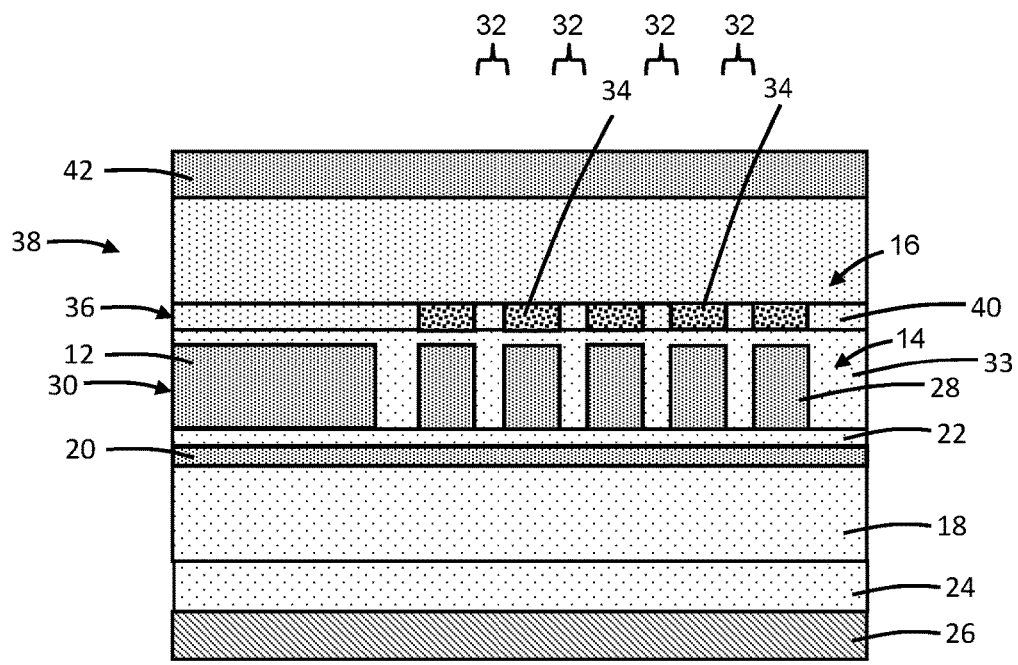
FIG. 5 is a cross-sectional view of the waveguide arrangement at a fabrication stage of the processing method subsequent to FIG. 4.

With reference to FIG. 5 in which like reference numerals refer to like features in FIGS. 3, 4 and at a subsequent fabrication stage of the processing method, the metallization level 36 is included in an interconnect structure 38, and the interconnect structure 38 includes additional metallization levels that are positioned over metallization level 36. The additional metallization levels of the interconnect structure 38 are also formed by BEOL processing. In alternative embodiments, the metallization level 36 containing the grating coupler 16 may be a higher metallization level (e.g., M2, M3, etc.) in the interconnect structure 38 that is arranged over the M1 metallization level in order to increase the vertical spacing between the grating coupler 14 and the grating coupler 16, which may improve the coupling efficiency. In these alternative embodiments, the interlayer dielectric layer of the M1 metallization level and the interlayer dielectric layer of any other intervening metallization levels may be free of metal features in a vertical direction between the grating coupler 14 and the grating coupler 16.

A cladding layer 42 may be formed over the interconnect structure 38. The cladding layer 42 may be composed of a dielectric material, such as silicon nitride ($Si_3N_4$), deposited by chemical vapor deposition. In an alternative embodiment, the cladding layer 42 may be omitted. Other than the grating structures 34 of the grating coupler 16 in the dielectric layer 40 of metallization level 36, metal features may be absent in the interconnect structure 38 in the metallization levels over the metallization level 36 and between the metallization level 36 and the cladding layer 42.

Figure 6:
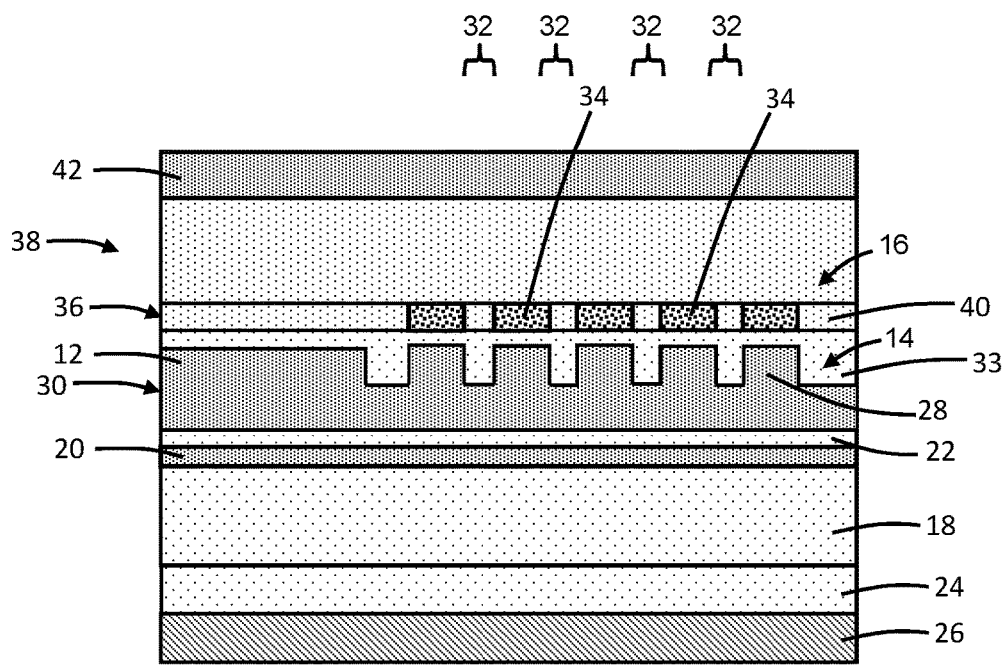
FIGS. 6-13 are cross-section views similar to FIG. 5 of waveguide arrangements for a photonics chip in accordance with alternative embodiments of the invention.

With reference to FIG. 6 in which like reference numerals refer to like features in FIG. 5 and in accordance with alternative embodiments of the invention, the etching process forming the grooves 32 and grating structures 28 may be controlled to etch the grooves 32 only partially through the layer 30. The result is that a partial thickness of the layer 30 provides a web that connects the grating structures 28 and may connect the waveguide 12 with the grating coupler 14.

Figure 7:
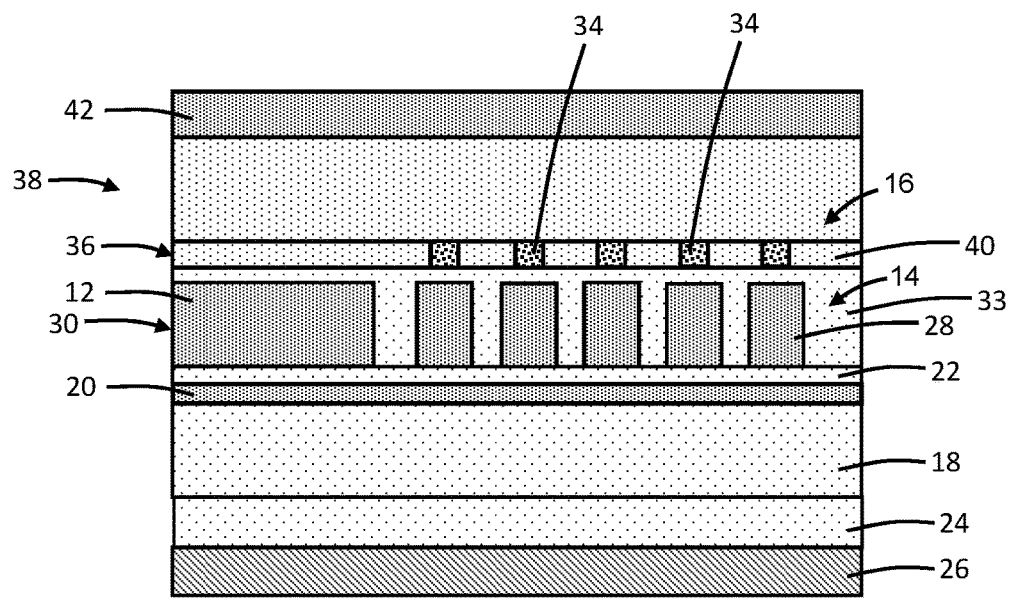

With reference to FIG. 7 in which like reference numerals refer to like features in FIG. 5 and in accordance with alternative embodiments of the invention, the grating structures 28 of the grating coupler 14 and the grating structures 34 of the grating coupler 16 may have different pitches and/or different duty cycles. In the representative embodiment, the grating structures 34 have a different duty cycle than the grating structures 28. Despite the difference in pitch and/or duty cycle, an overlapping relationship may be maintained between the respective side edges of the grating structures 28 and the grating structures 34.

Figure 8:
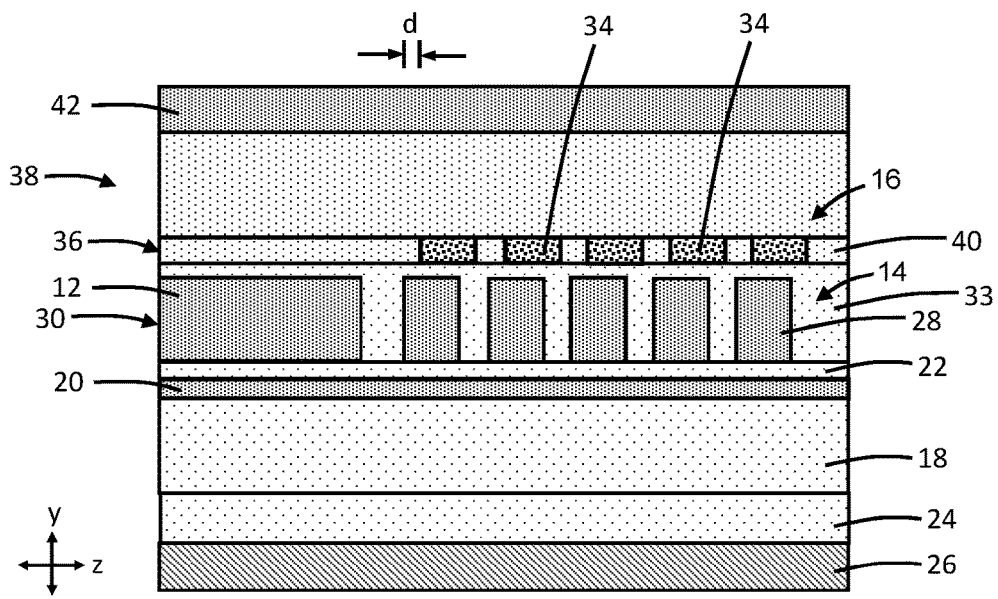

With reference to FIG. 8 in which like reference numerals refer to like features in FIG. 5 and in accordance with alternative embodiments of the invention, the grating structures 34 of the grating coupler 16 may be shifted laterally within the metallization level 36 relative to the grating structures 28 of the grating coupler 14 such that the respective side edges are no longer aligned. In the representative embodiment, the grating structures 28 and the grating structures 34 have the same pitch and duty cycle, and are shifted laterally (i.e., along the z-axis) by a distance, d, relative to each other. Despite the lateral shift, an overlapping relationship may be maintained between the respective side edges of the grating structures 28 and the grating structures 34.

Figure 9:
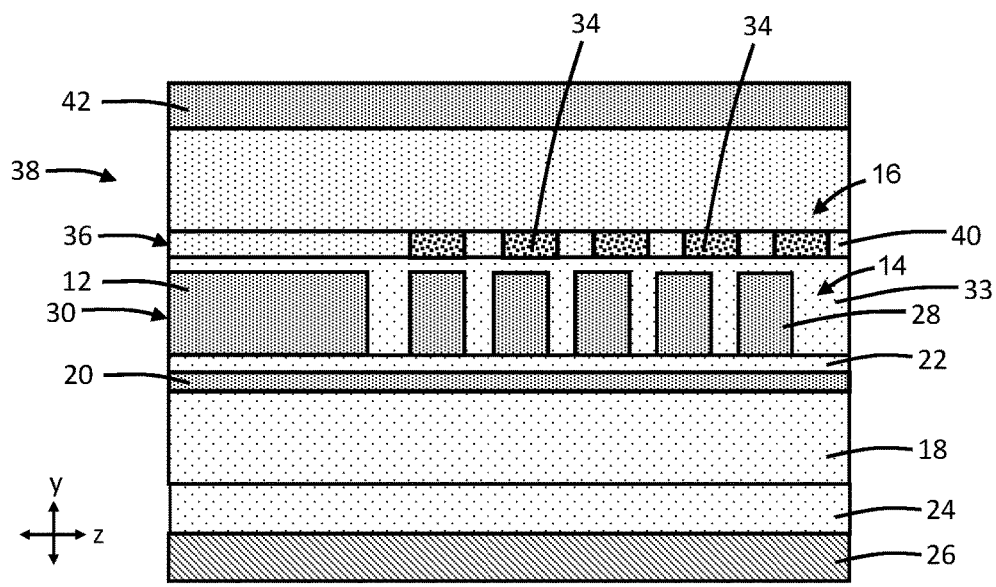

With reference to FIG. 9 in which like reference numerals refer to like features in FIG. 5 and in accordance with alternative embodiments of the invention, the grating structures 34 of the grating coupler 16 may be apodized with a pitch that varies as a function of position (i.e., location along the z-axis), while the grating structures 28 of the grating coupler 14 may have a constant pitch. Despite the difference in pitch, an overlapping relationship may be maintained between the respective side edges of the grating structures 28 and the grating structures 34.

Figure 10:
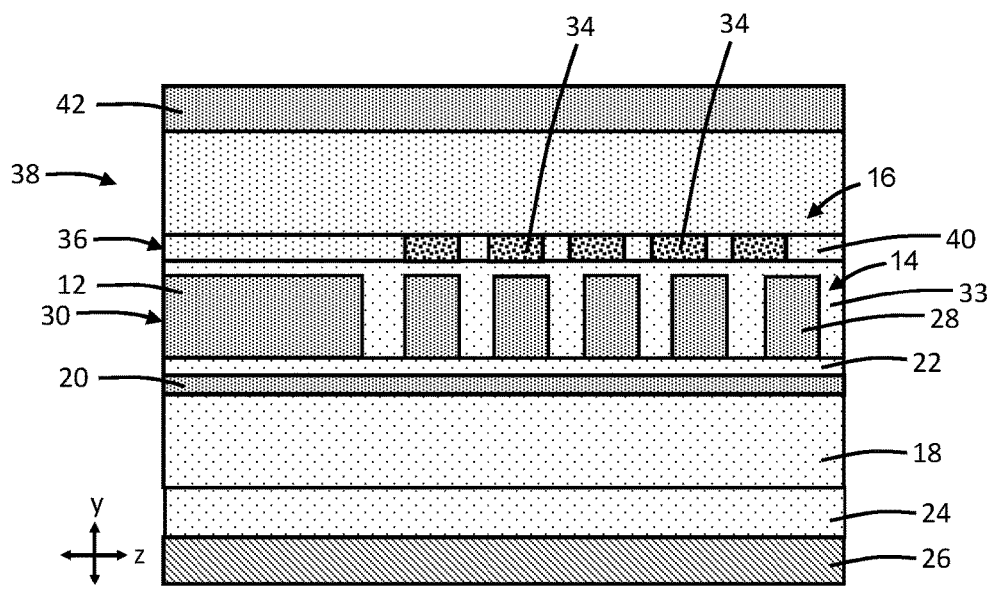

With reference to FIG. 10 in which like reference numerals refer to like features in FIG. 5 and in accordance with alternative embodiments of the invention, the grating structures 28 of the grating coupler 14 may be apodized with a pitch that varies as a function of position (i.e., location along the z-axis), while the grating structures 34 of the grating coupler 16 may have a constant pitch. In an alternative embodiment, the grating structures 34 of the grating coupler 16 may also be apodized as shown in FIG. 6 such that both sets of grating structures 28, 24 are apodized with a varying pitch. Despite the difference in pitch, an overlapping relationship may be maintained between the respective side edges of the grating structures 28 and the grating structures 34.

Figure 11:
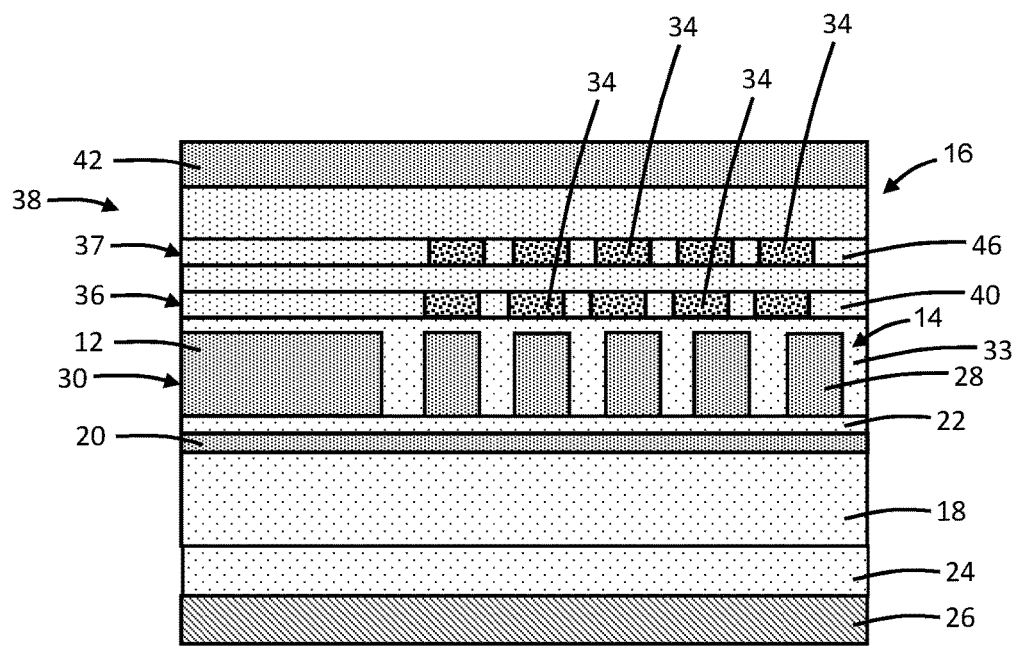

With reference to FIG. 11 in which like reference numerals refer to like features in FIG. 5 and in accordance with alternative embodiments of the invention, the grating structures 34 of the grating coupler 16 may be arranged and distributed in multiple metallization levels 36, 37 of the interconnect structure 38. In the representative embodiment, some of the grating structures 34 may be arranged in the metallization level 36, and some of the grating structures 34 may be arranged in an interlayer dielectric layer 46 of the metallization level 37. In the representative embodiment, the metallization level 36 may be the lowest metallization level (M1) and the metallization level 37 may be the third metallization level (M3) with the interlayer dielectric layer of the second metallization level (M2) intervening between the M1 and M3 levels. In alternative embodiments, the grating structures 34 of the grating coupler 16 may be distributed in metallization levels 37, 38 of the interconnect structure 38 that are adjacent and not separated from each other by the interlayer dielectric layer of an intervening metallization level. In alternative embodiments, the grating structures 34 of the grating coupler 16 may be distributed in more than two of the metallization levels of the interconnect structure 38, or may be distributed in any combination of two or more of the metallization levels of the interconnect structure 38.

Figure 12:
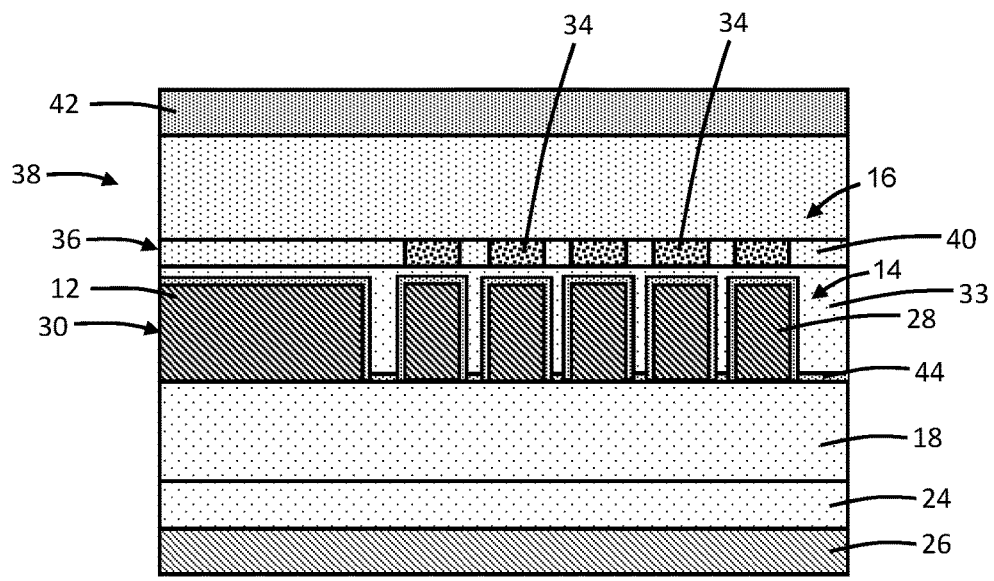

With reference to FIG. 12 in which like reference numerals refer to like features in FIG. 5 and in accordance with alternative embodiments of the invention, the waveguide 12 and the grating coupler 14 may be composed of a material that is not a dielectric material. In an embodiment, the waveguide 12 and grating coupler 14 may be composed of polycrystalline silicon (polysilicon) deposited by chemical vapor deposition and patterned with a lithography and etching process to form the waveguide 12 and the grating structures 28 of the grating coupler 14. The waveguide 12 and grating coupler 14 are arranged on the dielectric layer 18 as the dielectric layers 20 and 22 are omitted. A conformal layer 44, which may be composed of silicon nitride ($Si_3N_4$), is formed by, for example, atomic layer deposition over the grating structures 28. The optional cladding layer 42 may be applied over the interconnect structure 38, and the grating structures 28 may have any of the modified constructions shown in FIGS. 6-11.

Figure 13:
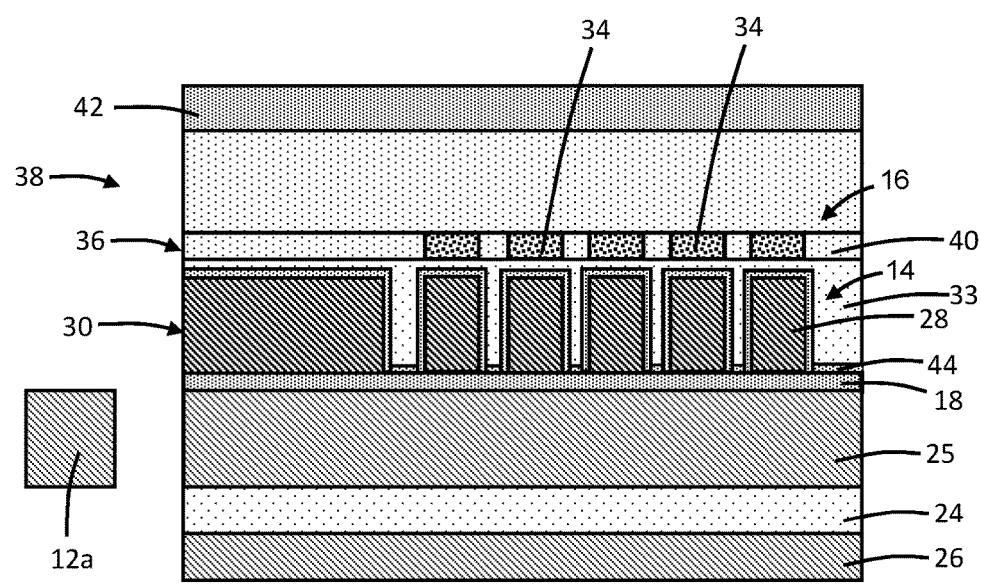

With reference to FIG. 13 in which like reference numerals refer to like features in FIG. 12 and in accordance with embodiments of the invention, the waveguide 12 may be replaced by a waveguide 12a that is patterned from the single-crystal semiconductor material (e.g., single-crystal silicon) of a device layer 25 of the SOI substrate. The grating couplers 14, 16 are arranged over a section of the device layer 25 that is adjacent to the waveguide 12a. The optional cladding layer 42 may be applied over the interconnect structure 38, and the grating structures 28 may have any of the modified constructions shown in FIGS. 6-11. In an alternative embodiment, the structure 10 of FIG. 5 may be modified to replace the waveguide 12 with the waveguide 12a having the layer 18 thinned to reflect the retention of the device layer 25 beneath the grating couplers 14, 16.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. In the latter case, the chip is mounted in a single chip package (e.g., a plastic carrier, with leads that are affixed to a motherboard or other higher level carrier) or in a multichip package (e.g., a ceramic carrier that has either or both surface interconnections or buried interconnections). In any case, the chip may be integrated with other chips, discrete circuit elements, and/or other signal processing devices as part of either an intermediate product or an end product.

References herein to terms such as "vertical", "horizontal", "lateral", etc. are made by way of example, and not by way of limitation, to establish a frame of reference. Terms such as "horizontal" and "lateral" refer to a direction in a plane parallel to a top surface of a semiconductor substrate, regardless of its actual three-dimensional spatial orientation. Terms such as "vertical" and "normal" refer to a direction perpendicular to the "horizontal" direction. Terms such as "above" and "below" indicate positioning of elements or structures relative to each other and/or to the top surface of the semiconductor substrate as opposed to relative elevation.

A feature "connected" or "coupled" to or with another element may be directly connected or coupled to the other element or, instead, one or more intervening elements may be present. A feature may be "directly connected" or "directly coupled" to another element if intervening elements are absent. A feature may be "indirectly connected" or "indirectly coupled" to another element if at least one intervening element is present.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a first grating coupler including a first plurality of grating structures;
   an interconnect structure including a first metallization level positioned over the first grating coupler; and
   a second grating coupler including a second plurality of grating structures that are arranged in the first metallization level to overlap with the first grating coupler, the second plurality of grating structures comprised of a metal.

2. The structure of claim 1 wherein the first plurality of grating structures are comprised of silicon nitride.

3. The structure of claim 1 wherein the first plurality of grating structures are comprised of polysilicon.

4. The structure of claim 1 wherein the first plurality of grating structures are comprised of silicon nitride.

5. The structure of claim 1 wherein the first plurality of grating structures are comprised of a non-metal.

6. The structure of claim 1 wherein the first grating coupler, the second grating coupler, and the interconnect structure are arranged on a substrate, and further comprising:
   a plurality of electronic components on the substrate.

7. The structure of claim 6 wherein the first metallization level of the interconnect structure is arranged over the plurality of electronic components.

8. The structure of claim 6 wherein the first metallization level of the interconnect structure is arranged directly over the plurality of electronic components.

9. The structure of claim 6 wherein the interconnect structure includes a second metallization level over the first metallization level, and the second grating coupler includes a third plurality of grating structures that are arranged in the second metallization level of the interconnect structure.

10. The structure of claim 1 wherein the first plurality of grating structures are arranged with a first pitch and a first filling factor, and the second plurality of grating structures are arranged with a second pitch substantially equal to the first pitch and a second filling factor substantially equal to the first filling factor.

11. The structure of claim 1 wherein the first plurality of grating structures are arranged with a first pitch and a first filling factor, the second plurality of grating structures are arranged with a second pitch and a second filling factor, and either the second pitch is different from the first pitch or the second filling factor is different from the first filling factor.

12. The structure of claim 1 wherein the first plurality of grating structures have a first pitch, the second plurality of grating structures have a second pitch substantially equal to the first pitch, and the second plurality of grating structures are shifted laterally relative to the first plurality of grating structures.

13. The structure of claim 1 wherein the first plurality of grating structures are arranged with a first pitch that is apodized and varies with position, and the second plurality of grating structures are arranged with a second pitch that is constant.

14. The structure of claim 1 wherein the first plurality of grating structures are arranged with a first pitch that is constant, and the second plurality of grating structures are arranged with a second pitch that is apodized and varies with position.

15. The structure of claim 1 wherein the metal is copper, aluminum, cobalt, or titanium nitride, and the first metallization level includes an interlayer dielectric layer in which the second plurality of grating structures of the second grating coupler are arranged.

16. A method comprising:
   patterning a first layer to form a first grating coupler having a first plurality of grating structures; and
   forming a second plurality of grating structures of a second grating coupler in a first metallization level of an interconnect structure,
   wherein the second plurality of grating structures of the second grating coupler are arranged in the first metallization level over the first plurality of grating structures of the first grating coupler, and the second plurality of grating structures are comprised of a metal.

17. The method of claim 16 further comprising:
   forming a layer of material on a substrate; and
   patterning the layer of material to form the first plurality of grating structures, wherein the layer of material is patterned by etching partially through the layer of material or fully through the layer of material.

18. The method of claim 16 wherein the first grating coupler, the second grating coupler, and the interconnect structure are arranged on a substrate, and further comprising:
   forming a plurality of electronic components on the substrate.

19. The method of claim 18 wherein the first metallization level of the interconnect structure is arranged over or directly over the plurality of electronic components.

20. The method of claim 18 further comprising:
   forming a third plurality of grating structures of the second grating coupler in a second metallization level of the interconnect structure that is arranged over the first metallization level of the interconnect structure.

* * * * *